United States Patent [19]

Nakamura

[11] Patent Number: 5,425,132
[45] Date of Patent: Jun. 13, 1995

[54] ROBOT HAND APPARATUS WITH SIGNAL CONVERSION SECTIONS

[75] Inventor: Haruji Nakamura, Takatsuki, Japan

[73] Assignee: Matsushita Electric Industrial Co., Ltd., Osaka, Japan

[21] Appl. No.: 842,067

[22] Filed: Feb. 26, 1992

[30] Foreign Application Priority Data

Mar. 4, 1991 [JP] Japan .................. 3-037324

[51] Int. Cl.$^6$ .................. B23Q 3/155; H04L 3/00
[52] U.S. Cl. .................. 395/80; 395/901; 364/474.11; 901/31; 901/41
[58] Field of Search .................. 395/80, 901; 364/474.11; 901/30, 31, 32, 33, 34, 35, 36, 37, 38, 39, 40, 41, 42, 43, 44, 45; 29/39, 40, 33 M; 279/2.19, 2.21, 126; 414/730

[56] References Cited

U.S. PATENT DOCUMENTS

| | | | |
|---|---|---|---|
| 3,095,982 | 7/1963 | Weiser | 901/32 |
| 3,164,675 | 1/1965 | Buhrendorf | 341/100 |
| 3,949,635 | 4/1976 | Daniels | 901/30 |
| 4,314,524 | 2/1982 | Deguchi | 901/36 |
| 4,588,986 | 5/1986 | Byrne | 341/100 |
| 4,626,013 | 12/1986 | Barrows | 901/31 |
| 4,629,409 | 12/1986 | Satoh et al. | 901/44 |
| 4,655,676 | 4/1987 | Jannborg et al. | 901/31 |
| 4,693,664 | 9/1987 | Schweiker | 901/43 |
| 4,790,053 | 12/1988 | Godbecker | 29/39 |
| 4,794,627 | 12/1988 | Grimaldi | 341/101 |
| 4,930,976 | 6/1990 | Spacher et al. | 901/31 |
| 4,954,826 | 9/1990 | Isozaki et al. | 341/101 |
| 5,016,011 | 5/1991 | Hartley et al. | 341/100 |
| 5,108,117 | 4/1992 | Crossman et al. | 279/126 |
| 5,161,846 | 11/1992 | Yakou | 901/32 |

FOREIGN PATENT DOCUMENTS

| | | | |
|---|---|---|---|
| 0167550 | 8/1985 | Japan | 341/101 |
| 0164341 | 7/1986 | Japan | 341/101 |
| 0137923 | 6/1987 | Japan | 341/101 |
| 0204848 | 8/1988 | Japan | 341/101 |
| 2100889 | 4/1990 | Japan | |

*Primary Examiner*—Allen R. MacDonald
*Assistant Examiner*—George Davis
*Attorney, Agent, or Firm*—Ratner & Prestia

[57] ABSTRACT

A robot hand apparatus includes a hand base mounted on a shaft extending from the leading end of a robot main body, a rotary base rotatably held by the hand base, an electric contact provided on a contact surface of the hand base, an electric contact ring provided on a rotary contact surface of the rotary base, a plurality of chucks provided on the rotary base, a first signal converting device positioned on the robot main body side, and a second signal converting device positioned on the rotary base side. The first signal converting device converts parallel signals outputted from a robot control section into a serial signal so as to transmit the serial signal to the second signal converting device via contact between the electric contact and the electric contact ring, and converts a serial signal outputted from the second signal converting device into parallel signals so as to transmit the parallel signals to the robot control section. The second signal converting device converts the serial signal outputted from the first signal converting device into parallel signals so as to transmit the parallel signals to a chuck drive control section positioned on the rotary base side, and converts parallel signals outputted from the chuck drive control section into a serial signal so as to transmit the serial signal to the first signal converting device via the current transmitting device.

4 Claims, 5 Drawing Sheets

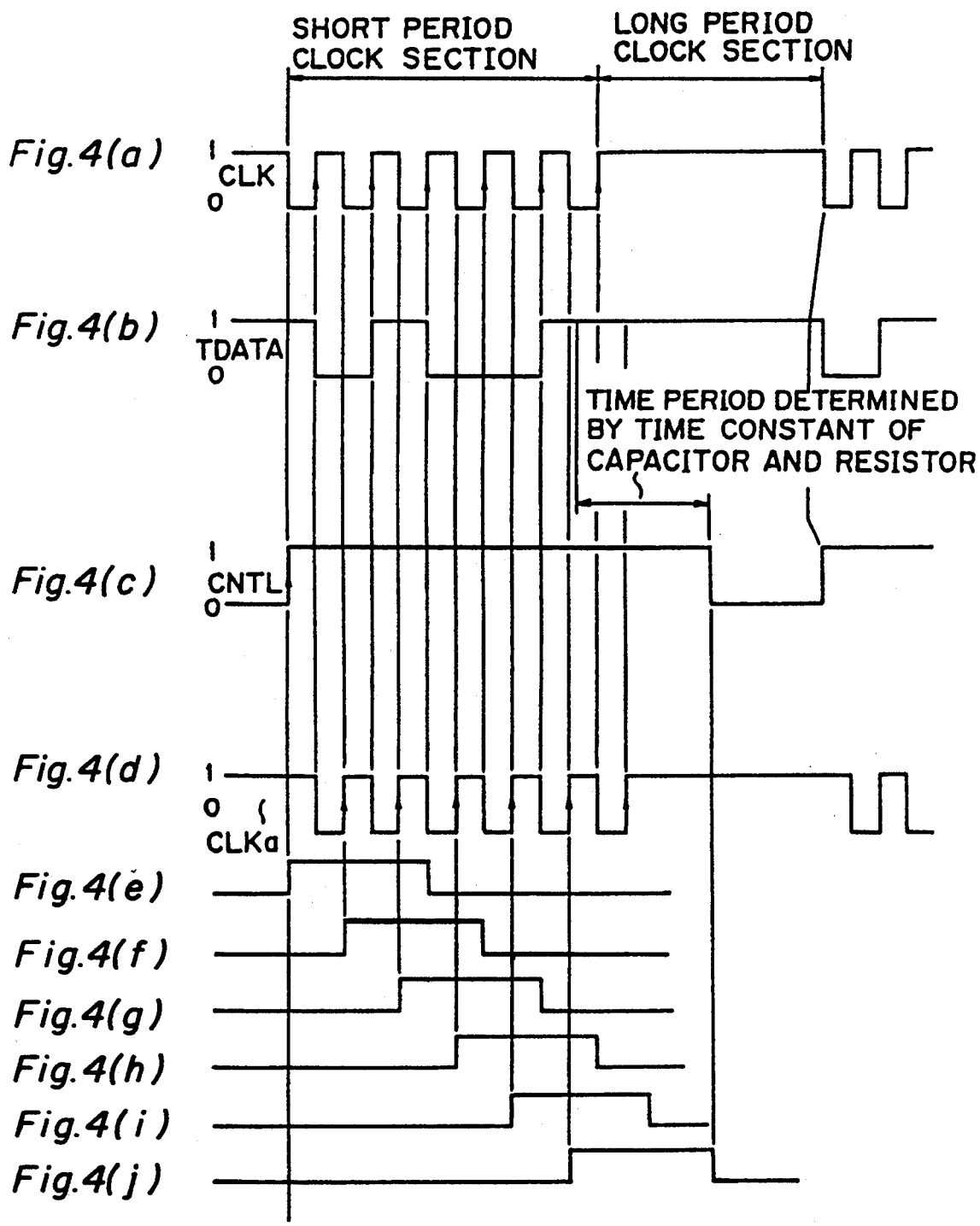

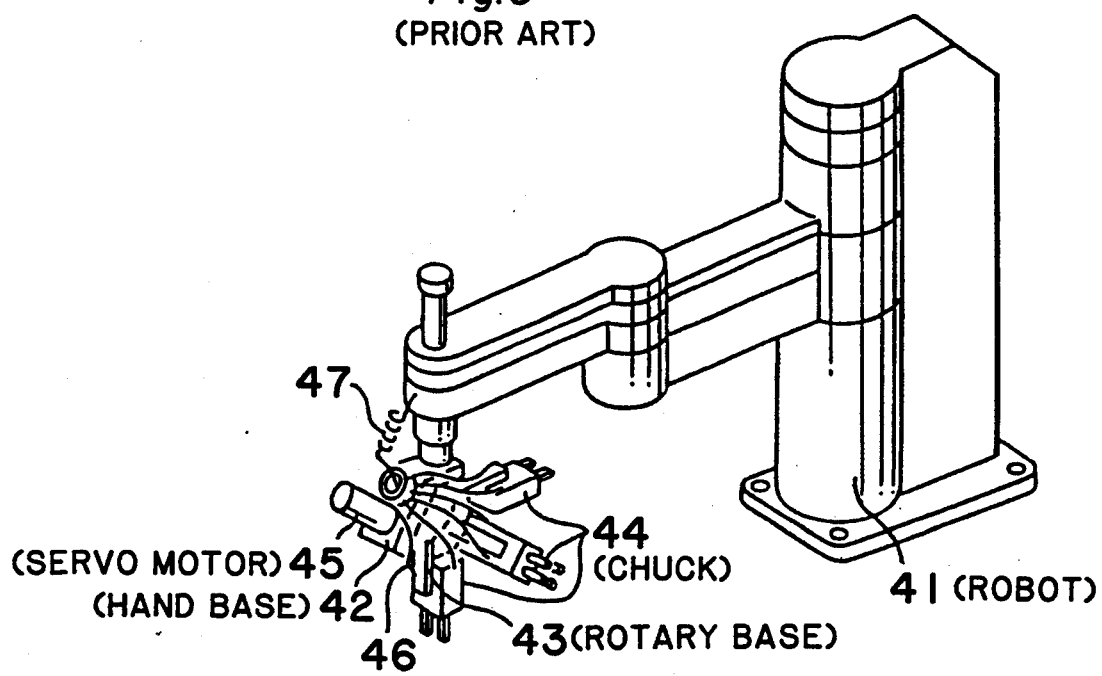

ROBOT HAND APPARATUS WITH SIGNAL CONVERSION SECTIONS

BACKGROUND OF THE INVENTION

The present invention relates to a robot hand apparatus of an industrial robot.

In recent years, in an automatic assembling process widely carried out, a robot has a plurality of rotatable hands which are sequentially selected in a predetermined order so that many kinds of parts are assembled. Thus, there is a growing demand for the development of a robot hand apparatus having a favorable performance.

A conventional robot hand apparatus is described below with reference to FIG. 5 which is a perspective view showing the conventional robot hand apparatus. A hand base 42 is mounted on a shaft extending from the leading end of a robot 41. The hand base 42 holds a rotary base 43 so that the rotary base 43 rotates at an inclined angle of 45° with respect to a horizontal plane. The rotary base 43 holds a plurality of chucks 44 in the periphery thereof at an angle of 45° with respect to the rotational shaft thereof.

A servo motor 45 is mounted on the hand base 42 and rotates the rotary base 43 through a speed reducing device. A first wire harness 46 is provided between the hand base 42 and the chucks 44. A second harness 47 is provided between the hand base 42 and the power source/control section (not shown) of the robot 41.

The operation of the above conventional robot hand apparatus is described below.

First, the power source/control section outputs a plurality of signals in parallel necessary for controlling the robot hand apparatus. The signals are inputted to the servo motor 45 through the second wire harness 47. In response to the instruction indicated by the signals, the servo motor 45 rotates the rotary base 43 so that the required chuck 44 is set immediately below the rotary base 43. In response to the instruction of the power source/control section through the first wire harness 46, the set chuck 44 starts a predetermined operation. Then, sensors provided on the chuck 44 and in the vicinity thereof feed signals back to the power source/control section via the first wire harness 46 so that the power source/control section controls the chuck 44 in carrying out the predetermined operation. After the operation terminates, the power source/control section outputs signals to the rotary base 43 and the chuck 44 so that a subsequent operation is performed according to instructions indicated by the signals.

As described above, the robot 41 performs a plurality of operations by selecting the required chuck 44.

However, according to the above-described conventional robot hand apparatus, since the first wire harness 46 is positioned between the hand base 42 and the chucks 44, the first wire harness 46 is twisted with the rotation of the rotary base 43. Since it is necessary to twist the first wire harness 46 simultaneously with the rotation of the rotary base 43 in order to rotate the rotary base 43, a great torque is required. The first wire harness 46 is required to be loosened so that the first wire harness 46 follows the rotary motion of the rotary base 43 and is bent. However, there is a possibility that a loosened portion of the first wire harness 46 interferes with other structures, thus causing a trouble in operation or damaging itself or other structures.

It is preferable to accommodate the first wire harness 46 in a structure. But according to the conventional art, a plurality of signals outputted from the power source/control section and a plurality of feedback signals outputted from the sensors pass through a plurality of the first wire harness 46 in parallel, which makes it difficult to accommodate the first wire harnesses 46 in the structure.

SUMMARY OF THE INVENTION

Accordingly, an essential object of the present invention is to provide a robot hand apparatus compact and reliable in operation.

In accomplishing these and other objects, there is provided a robot hand apparatus comprising:

a hand base mounted on a shaft extending from the leading end of a robot main body;

a rotary base rotatably held by the hand base;

an electric contact provided on a contact surface of the hand base;

an electric contact ring provided on a rotary contact surface of the rotary base;

a plurality of chucks provided on the rotary base;

a first signal converting means positioned on the robot main body side; and a second signal converting means positioned on the rotary base side, the first signal converting means converting parallel signals outputted from a robot control section into a serial signal so as to transmit the serial signal to the second signal converting means via contact between the electric contact and the electric contact ring, and converting a serial signal outputted from the second signal converting means into parallel signals so as to transmit the parallel signals to the robot control section, the second signal converting means converting the serial signal outputted from the first signal converting means into parallel signals so as to transmit the parallel signals to a chuck drive control section positioned on the rotary base side, and converting parallel signals outputted from the chuck drive control section into a serial signal so as to transmit the serial signal to the first signal converting means via the current transmitting means.

According to the robot hand apparatus of the above-described construction, since only a serial signal is transmitted between the first signal converting means positioned on the main body side and the second signal converting means positioned on the rotary base side, the number of wires connecting both signal converting sections with each other is smaller than that of the conventional apparatus in which parallel signals are separately and simultaneously transmitted through a plurality of wire harnesses. The reduction of the number of the wires allows the electric contact and the electric contact ring to be provided on the contact surfaces between the hand base and the rotary base and in addition, the wires to be accommodated in the shaft of the rotary base. Therefore, the rotary base can be rotated with a smaller torque, and there is no possibility that a loosened portion of a wire harness interferes with other structures, thus preventing the portion from causing a trouble in operation or damaging itself or other structures.

According to another aspect of the present invention, there is provided the robot hand apparatus as described above, wherein each of the first signal converting means and the second signal converting means comprises:

clock generating means for generating a common clock signal comprising a short period section having a plurality of short period clock signals and a long period section having one long period clock signal and alternately generating the short period section and the long period section;

timing signal generating means for outputting a timing signal, an inversion time period of which is set to be longer than a time period of the short period section by a time constant of a capacitor and a resistor attached thereto;

parallel/serial converting means controlled by the timing signal and the common clock signal; and serial/parallel converting means controlled by the timing signal and the common clock signal.

In addition, in another aspect of the present invention, the parallel/serial converting means and the serial/parallel converting means are controlled by the timing signal generating means and the clock generating means. Therefore, the communication between the signal converting means on the main body side and the signal converting means on the rotary base side are reliably performed.

BRIEF DESCRIPTION OF THE DRAWINGS

These and other objects and features of the present invention will become clear from the following description taken in conjunction with the preferred embodiments thereof with reference to the accompanying drawings, in which:

FIGS. 4(a), 4(b), 4(c), 4(d), 4(e), 4(f), 4(g), 4(h), 4(i) and 4(j) are timing charts showing the relationship between signals of FIG. 3; and FIG. 5 is a perspective view showing a conventional robot hand apparatus.

DETAILED DESCRIPTION OF THE INVENTION

Figure 1:
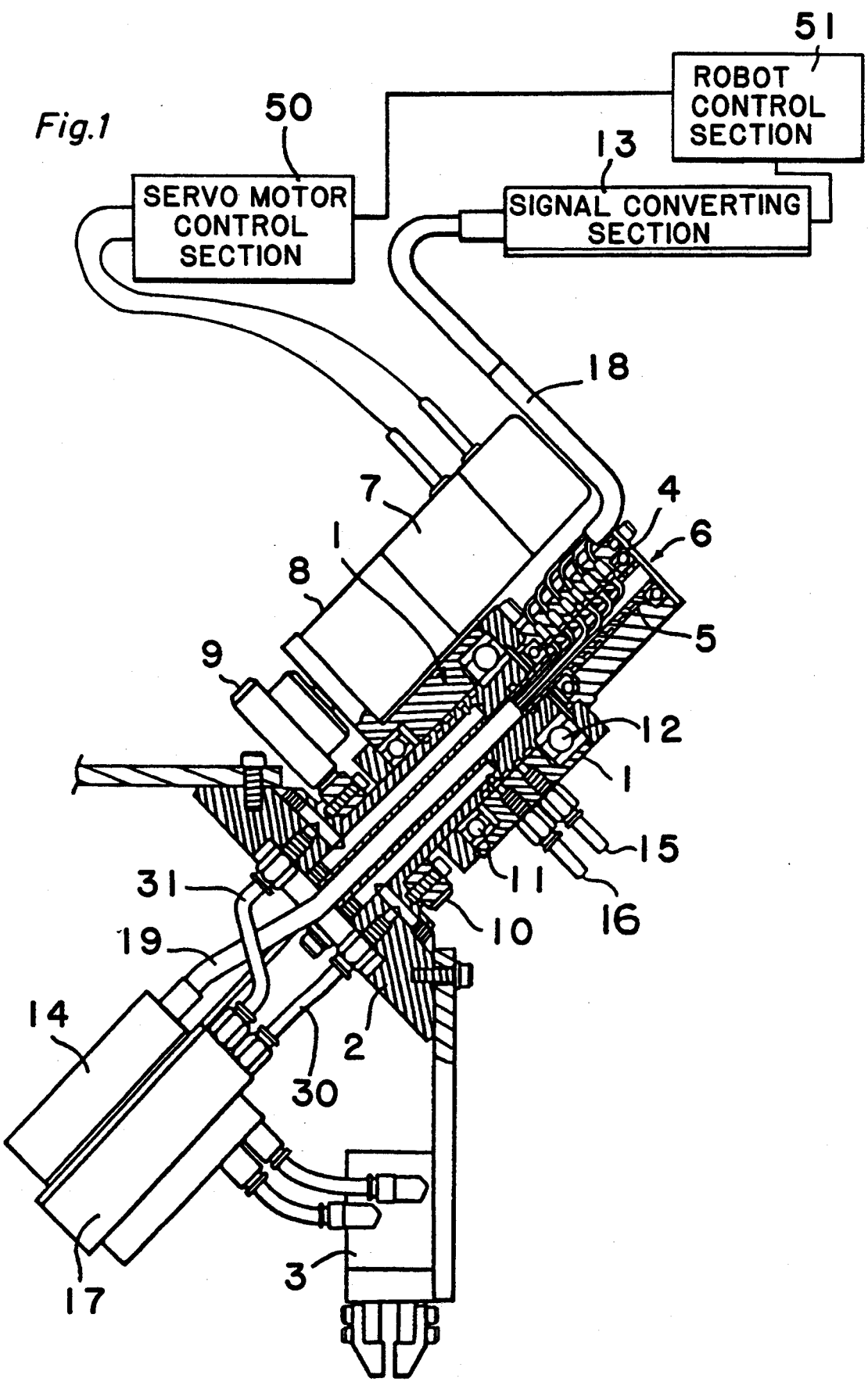
FIG. 1 is a partly sectional side elevation showing a robot hand apparatus according to an embodiment of the present invention.

Before the description of the present invention proceeds, it is to be noted that like parts are designated by like reference numerals throughout the accompanying drawings.

An embodiment of the present invention will be described below with reference to FIGS. 1, 2, 3, and 4(a)–4(j).

Figure 2:
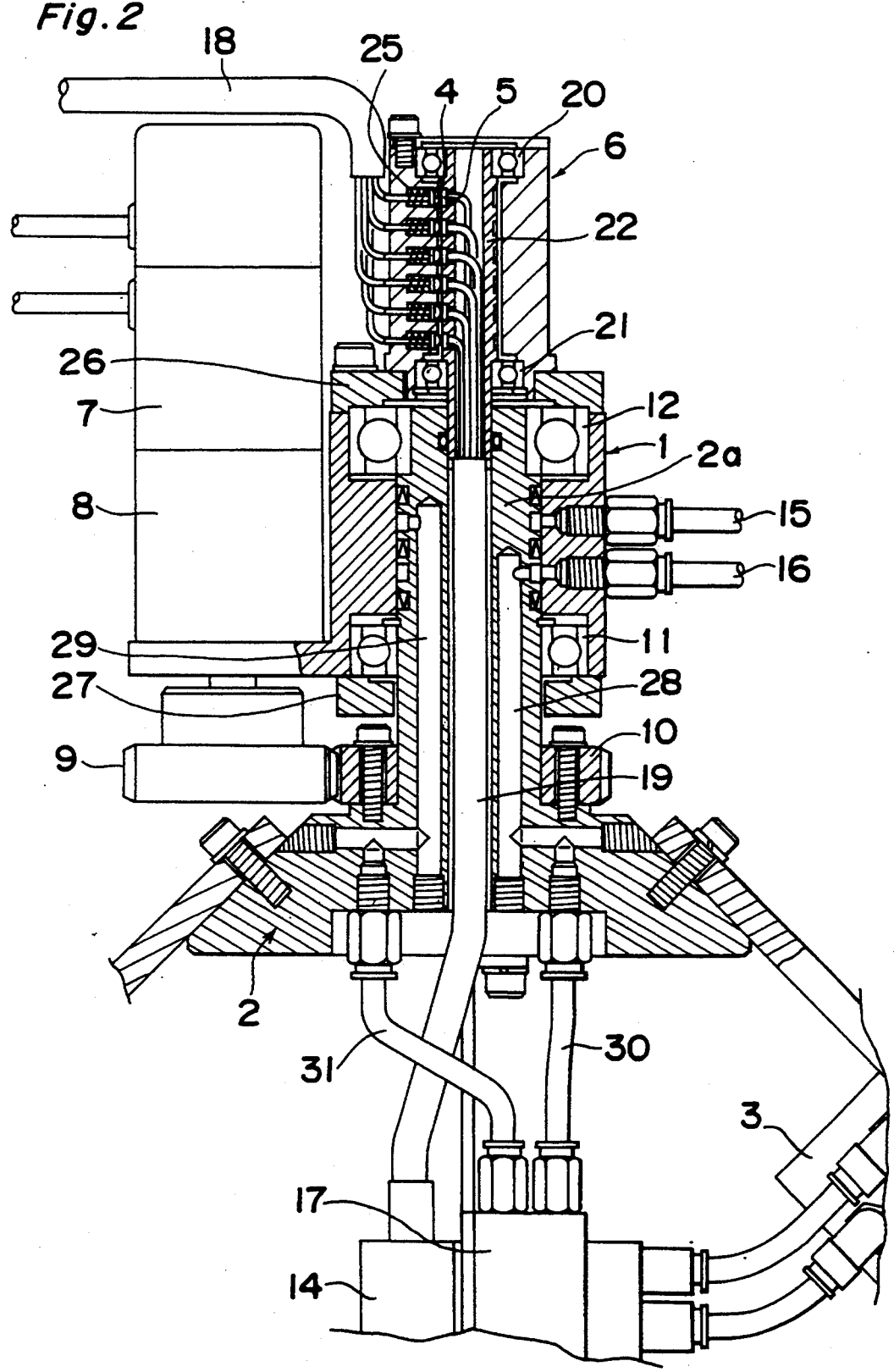
FIG. 2 is an enlarged side elevation, partly in section, showing the robot hand apparatus shown in FIG. 1.

FIG. 1 is a partly sectional side elevation of a robot hand apparatus according to the embodiment of the present invention. FIG. 2 is an enlarged side elevation, partly in section, showing the robot hand apparatus shown in FIG. 1.

The cylindrical hand base 1 is mounted on a shaft (not shown) extending from the leading end of a robot. The hand base 1 rotatably supports a rotary base 2 through ball bearings 11 and 12 at an angle of 45° with respect to a horizontal plane. The bearings 11 and 12 are supported at the cylindrical portion 2a of the rotary base 2 by fixing plate 26 and 27. The rotary base 2 supports a plurality of chucks 3 in the periphery of the end thereof at an angle of 45° with respect to the rotational shaft thereof. The hand base 1 is fixed to a cylindrical contact holder 6. The cylindrical portion 2a of the rotary base 2 is fixed to a rotary cylinder 22 rotatably supported in the holder 6 and the cylindrical portion 2a of the rotary base 2 by bearings 20 and 21 of the holder 6. The cylinder 22 rotates together with the rotary base 2. A plurality of electric contacts 4 are supported by the holder 6 and a plurality of electric contact rings 5 are supported by the cylinder 22 rotating in the holder 6. The electric contacts 4 are urged toward the electric contact rings 5 by springs 25 so that both are electrically connected with each other during the rotation of the cylinder 22 driven by the rotary base 2.

A servo motor 7 mounted on the hand base 1 rotates the rotary base 2 through a speed reducing device 8 and gears 9 and 10. The gear 10 is fixed to the rotary base 2.

A signal converting section 13 positioned on the main body (not shown) side of the robot communicates with a signal converting section 14 positioned on the rotary base 2 side. That is, the signal converting section 13 converts parallel signals outputted from a robot control section 51 through a connecting cord 18 into a serial signal, thus transmitting the serial signal to the signal converting section 14 through a connecting cord 19 and converts the serial signal outputted from the signal converting section 14 into parallel signals, thus transmitting the parallel signals to the robot control section 51. The signal converting section 14 converts the serial signal outputted from the signal converting section 13 into parallel signals, thus transmitting the parallel signals to a chuck driving means 17 comprising an electromagnetic air valve and converts parallel signals outputted from sensors provided on the chucks 3 and sensors positioned in the vicinity of the chucks 3 into a serial signal, thus transmitting the serial signal to the signal converting section 13.

A compressed air supply pipe 15 and a compressed air discharge pipe 16 are fixed to the hand base 1. Compressed air is sent from the compressed air supply pipe 15 to the chuck driving means 17 via a passage 29 of the rotary base 2 and a pipe 31 so that the chuck driving means 17 operates the chucks 3. Thereafter, the compressed air is discharged from the compressed air discharge pipe 16 via a pipe 30 and a passage 28 of the rotary base 2.

Figure 3:
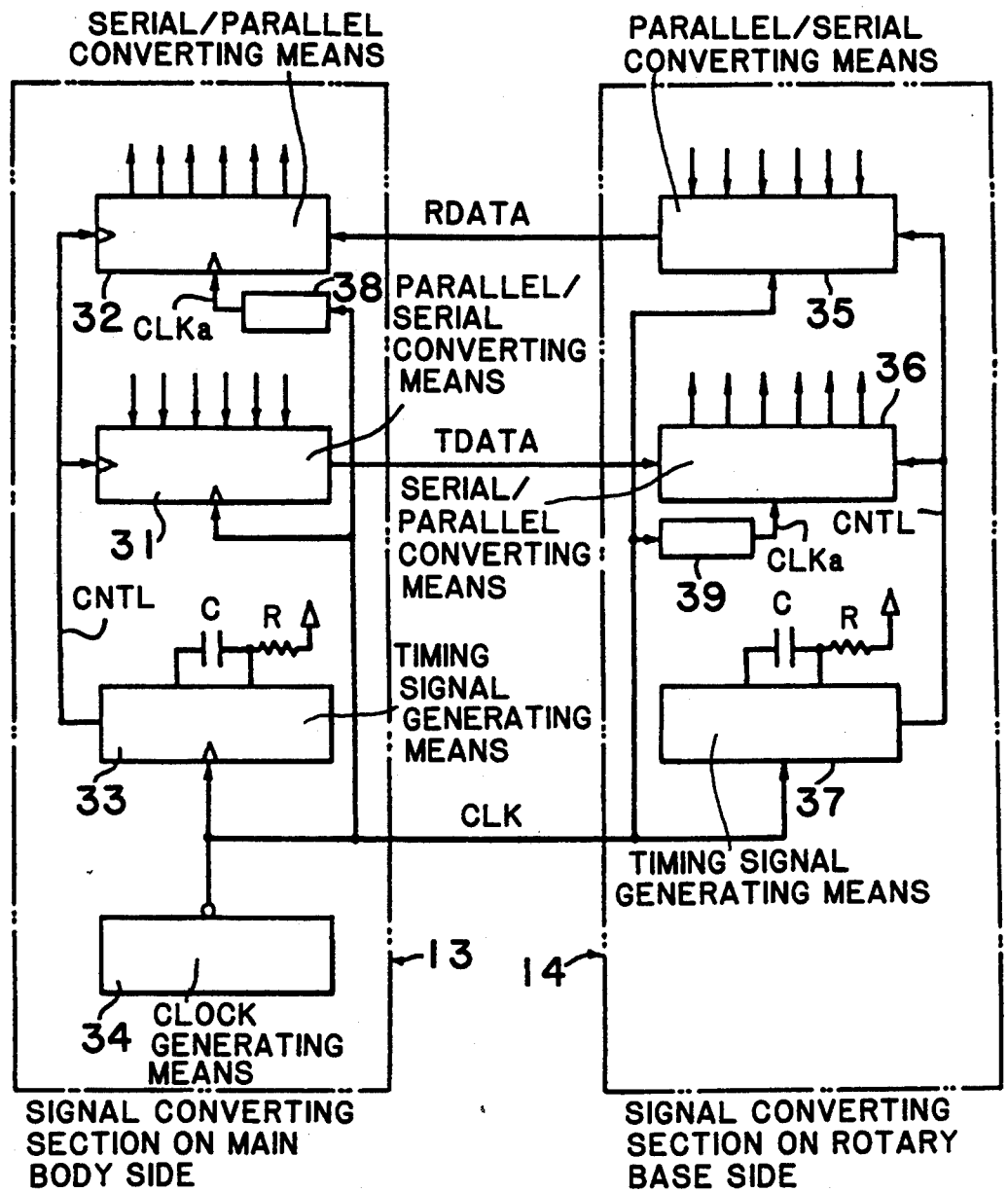
FIG. 3 is a block diagram showing a signal converting section positioned on a robot side and a signal converting section positioned on a rotary base side.

FIG. 3 is a block diagram showing the construction of the signal converting sections 13 and 14. The signal converting section 13 comprises a parallel/serial converting means 31, a serial/parallel converting means 32, and a timing signal generating means 33. Similarly, the signal converting section 14 comprises a parallel/serial converting means 35, a serial/parallel converting means 36, and a timing signal generating means 37.

FIGS. 4(a)–4(j) are timing charts showing the relationship between the signals shown in FIG. 3. The signals are all represented by the combination of "0" and "1".

The signal converting section 13 accommodates a clock generating means 34 for generating a common clock signal comprising a short period section consisting of a plurality of short period clock signals and a long period section consisting of one long period clock signal as shown in FIG. 4(a). The generated clock signal is transmitted to all the means of the signal converting section 13 and all the means of the signal converting section 14, namely, the parallel/serial converting means 31 and 35, the serial/parallel converting means 32 and 36, and the timing signal generating means 33 and 37. The generated clock signal is transmitted to the serial/- parallel converting means 32 and 36 via a delay means 38 and 39, respectively,

The time constant of a capacitor (C) and a resistor (R) attached to the timing signal generating means 33 and 37 serve as means for setting the inversion time period of the timing signal generated by the timing signal generating means 33 and 37 to be longer than the time period of the short period section as shown by "CNTL" in FIGS. 3 and 4(c). Each of signals shown in FIGS. 4(e)–(j) rise to the state of "1" behind the time of each fall of the clock signal CLK of FIG. 4(a) and then fall to the state "0" after the predetermined time period determined by the time constant of the capacitor (C) and the register (R). Then, the signals shown in FIGS. 4(e)–(j) are added to form the inversion time period of the signal CNTL of FIG. 4(c).

The delay means 38 and 39 delay the cycle of the common clock signal by approximately half of one waveform of the short period clock signal as shown in FIG. 4(d).

The operation of the robot hand apparatus of this embodiment is described below with reference to FIGS. 1, 2, 3, and 4.

First, the servo motor 7 is actuated in response to a serial signal outputted from a servo motor control section 50 connected to the robot control section 51, thus rotating the rotary base 2 so as to set the required chuck 3 immediately below the rotary base 2 as shown in FIG. 1. In response to the serial signal outputted from the signal converting section 13, the chuck driving means 17 is actuated to open and close the chuck 3. At this time, compressed air is supplied from the compressed air supply pipe 15 and discharged from the compressed air discharge pipe 16. Since the serial signal outputted from the signal converting section 13 passes through the electric contacts 4 and the electric contact rings 5, it is unnecessary to provide the apparatus with a wire harness unlike the conventional art. Therefore, troubles of the conventional apparatus as described previously do not occur.

Upon actuation of the chuck 3, the signal converting section 14 converts parallel signals outputted from the sensor provided on the chuck 3 and the sensors provided in the vicinity thereof into a serial signal, thus transmitting the serial signal to the robot control section 51 through the signal converting section 13. That is, the serial signal is used for feedback control. In this manner, the chuck 3 performs a predetermined operation.

After this operation terminates, the servo motor 7 is actuated in response to a serial signal outputted from the servo motor control section 50, thus rotating the rotary base 2 and setting the required chuck 3 immediately below the rotary base 2 so as to continue the operation.

The parallel to serial conversion and serial to parallel conversion are carried out as follows. The common clock signal CLK, as shown in FIGS. 3 and 4(a)–4(j), comprising the short period section of the plural short period clock signals and the long period section of one long period clock signal is transmitted to all the means of the signal converting section 13 and all the means of the signal converting section 14. The short period clock signal and one long period clock signal of the common clock signal CLK are alternately generated by the clock generating means 34.

As described previously, each of the timing signal generating means 33 and 37 generates a signal, as shown by CNTL of FIGS. 3 and 4(c), the inversion time period of which is set to be longer than the time period of the short period clock signal by means of the time constant of the capacitor (C) and the resistor (R) attached thereto, thus sending the signal CNTL to the parallel/serial converting means 31 and the serial/parallel converting means 32 or to the parallel/serial converting means 35 and the serial/parallel converting means 36. As shown in FIG. 4(d), the signal CNTL keeps the state of "1" until the time period determined by the time constant of the capacitor (C) and the resistor (R) elapses and then, falls behind the time of the final fall of the short period clock signal CLK. Then, the signal CNTL rises to the state of "1" upon subsequent fall of the common signal CLK.

Parallel signals outputted from the robot control section 51 are inputted to the input section of the parallel/serial converting means 31 of the signal converting section 13 and loaded at the rise edge of the signal CNTL outputted from the timing signal generating means 33. The parallel/serial converting means 31 converts the loaded parallel signals into a serial signal TDATA, thus outputting the serial signal TDATA shown in FIG. 4(b) from a lower digit "0" at the rise edge of the short period clock signal of the common clock signal CLK. At this time, the parallel/serial converting means 31 shifts the loaded parallel signals to the lower order by one bit. This operation is repeated according to the number of the rise edges of the common clock signal CLK so as to convert one of the parallel signals into a part of the serial signal TDATA.

Upon input of the serial signal TDATA to the input section of the serial/parallel converting means 36, the serial signal TDATA is loaded in the higher order place "1" in an internal register of the serial/parallel converting means 36 at the rise of the short period clock signal of a signal CLKa delayed by the delay means 39 by approximately half cycle behind the rise of the common clock signal CLK and simultaneously, the serial signal TDATA is shifted to the lower order by one bit in the internal register shifts. This operation is repeated according to the number of the rise edges of the common clock signal CLK so as to convert a part of the serial signal TDATA into one parallel signal. Similarly, a subsequent part of the serial signal TDATA is converted into the following parallel signal at the subsequent rise edge of the short period clock signal of the signal CLKa. Parallel signals thus obtained pass through the internal register of the serial/parallel converting means 36 at the rise of the CNTL signal. The parallel signals are used to control each portion of the robot by the output of an electric potential generated at this time in the internal register.

Parallel signals outputted from the sensor mounted on the chuck 3 and the sensors provided in the vicinity thereof are inputted to the parallel/serial converting means 35 of the signal converting section 14, and then, converted into a serial signal RDATA similarly to the above serial signal TDATA, and thereafter transmitted to the serial/parallel converting means 32 of the signal converting section 13 which converts the serial signal RDATA into parallel signals to be used for feedback controls.

Various changes and modifications of the robot hand apparatus of the present invention may be made.

For example, the design of the hand base, the rotary base, the chuck, the electric contact, and the electric contact ring may be modified as desired.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A robot hand apparatus comprising:
   a hand base mounted on a shaft extending from a leading end of a robot main body;
   a rotary base rotatably held by the hand base;
   an electric contact provided on a contact surface of the hand base;
   an electric contact ring provided on a rotary contact surface of the rotary base;
   a plurality of chucks provided on the rotary base;
   a first signal converting means positioned on a robot main body side; and
   a second signal converting means positioned on a rotary base side, the first signal converting means converting parallel signals outputted from a robot control section into a serial signal so as to transmit the serial signal to the second signal converting means via contact between the electric contact and the electric contact ring, and converting a serial signal outputted from the second signal converting means into parallel signals so as to transmit the parallel signals to the robot control section, the second signal converting means converting the serial signal outputted from the first signal converting means into parallel signals so as to transmit the parallel signals to a chuck drive control section positioned on the rotary base side, and converting parallel signals outputted from the chuck drive control section into a serial signal so as to transmit the serial signal to the first signal converting means via a current transmitting means;
   wherein said first signal converting means comprises clock generating means for generating a common clock signal comprising a short period section having a plurality of short period clock signals and a long period section having one long period clock signal and alternately generating a short period section and a long period section; and wherein
   each of the first signal converting means and the second signal converting means comprises:
   timing signal generating means for outputting a timing signal, an inversion time period which is set to be longer than a time period of the short period section by a time constant of a capacitor and a resistor attached thereto;
   parallel/serial converting means controlled by the timing signal and the common clock signal; and
   serial/parallel converting means controlled by the timing signal and the common clock signal; and wherein
   said clock signal is transferred to the timing signal generating means of the first signal converting means and the timing signal generating means of the second signal converting means.

2. The robot hand apparatus as claimed in claim 1, wherein the timing signal rises at a time of a fall of the short period clock signals of the common clock signal, and keeps a risen state until a time period based on the time constant determined by the time constant of the capacitor and the resistor elapses and then, falls behind a time of a fall of the short period clock signal of the common clock signal.

3. A robot hand apparatus adapted for connection to a shaft of a robot main body having a robot control section adapted to generate parallel signals, said robot hand apparatus comprising:
   (a) a hand base mounted on the shaft of the robot main body and having a contact surface;
   (b) a rotary base rotatably attached to said hand base and having a rotary contact surface;
   (c) an electric contact disposed on said contact surface of said hand base;
   (d) an electric contact ring disposed on said rotary contact surface of said rotary base for contact with said electric contact disposed on said hand base;
   (e) a plurality of chucks and a chuck drive control section disposed on said rotary base, said chuck drive control section for generating parallel signals;
   (f) first signal converting means adapted to be disposed on the robot main body for:
      (1) receiving the parallel signals from the robot control section,
      (2) converting the parallel signals from the robot control section into a serial signal,
      (3) transmitting said serial signal developed by said first signal converting means,
      (4) converting a second serial signal into parallel signals, and
      (5) transmitting parallel signals developed by said first signal converting means to the robot control section; and
   (g) second signal converting means disposed on said rotary base for:
      (1) receiving said serial signal transmitted by said first signal converting means through contact between said electric contact disposed on said hand base and said electric contact ring,
      (2) converting said serial signal transmitted by said first signal converting means into parallel signals,
      (3) transmitting said parallel signals developed by said second signal converting means to said chuck drive control section,
      (4) converting said parallel signals from said chuck drive control section to said second serial signal, and
      (5) transmitting said second serial signal developed by said second signal converting means to said first signal converting means through contact between said electric contact disposed on said hand base and said electric contact ring;
   wherein said first signal converting means comprises clock generating means for generating a common clock signal comprising a short period section having a plurality of short period clock signals and a long period section having one long period clock signal and alternately generating a short period section and a long period section;
   wherein each of the first signal converting means and the second signal converting means comprises:
   timing signal generating means for outputting a timing signal, an inversion time period which is set to be longer than a time period of the short period section by a time constant of a capacitor and a resistor attached thereto;
   parallel/serial converting means controlled by the timing signal and the common clock signal; and
   serial/parallel converting means controlled by the timing signal and the common clock signal;

and wherein said clock signal is transferred to the timing signal generating means of the first signal converting means and the timing Signal generating means of the second signal converting means.

4. A robot comprising:
(a) a robot main body having a shaft and a robot control section adapted to generate parallel signals;
(b) a hand base mounted on said shaft and having a contact surface;
(c) a rotary base rotatably attached to said hand base and having a rotary contact surface;
(d) an electric contact disposed on said contact surface of said hand base;
(e) an electric contact ring disposed on said rotary contact surface of said rotary base for contact with said electric contact from said hand base;
(f) a plurality of chucks and a chuck drive control section disposed on said rotary base, said chuck drive control section for generating parallel signals;
(g) first signal converting means disposed on said robot main body for:
 (1) receiving said parallel signals from said robot control section,
 (2) converting said parallel signals from said robot control section into a serial signal,
 (3) transmitting said serial signal developed by said first signal converting means,
 (4) converting a second serial signal into parallel signals, and
 (5) transmitting parallel signals developed by said first signal converting means to said robot control section; and
(h) second signal converting means disposed on said rotary base for:
 (1) receiving said serial signal transmitted by said first signal converting means through contact between said electric contact disposed on said hand base and said electric contact ring,
 (2) converting said serial signal transmitted by said first signal converting means into parallel signals,
 (3) transmitting said parallel signals developed by said second signal converting means to said chuck drive control section,
 (4) converting said parallel signals from said chuck drive control section to said second serial signal, and
 (5) transmitting said second serial signal developed by said second signal converting means to said first signal converting means through contact between said electric contact disposed on said hand base and said electric contact ring;

wherein said first signal converting means comprises clock generating means for generating a common clock signal comprising a short period section having a plurality of short period clock signals and a long period section having one long period clock signal and alternately generating a short period section and a long period section; and wherein each of the first signal converting means and the second signal converting means comprises:

timing signal generating means for outputting a timing signal, an inversion time period which is set to be longer than a time period of the short period section by a time constant of a capacitor and a resistor attached thereto;

parallel/serial converting means controlled by the timing signal and the common clock signal; and serial/parallel converting means controlled by the timing signal and the common clock signal; and wherein said clock signal is transferred to the timing signal generating means of the first signal converting means and the timing signal generating means of the second signal converting means.

* * * * *